United States Patent
Roeglin et al.

(10) Patent No.: US 10,076,976 B2
(45) Date of Patent: *Sep. 18, 2018

(54) SEAT PEDESTAL

(71) Applicant: LIPPERT COMPONENTS MANUFACTURING, INC., Elkhart, IN (US)

(72) Inventors: Timothy Roeglin, Elkhart, IN (US); Hari Sunkara, Elkhart, IN (US); Allan McGuire, Elkhart, IN (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,008

(22) Filed: Apr. 17, 2017

(65) Prior Publication Data

US 2017/0320406 A1    Nov. 9, 2017

Related U.S. Application Data

(63) Continuation-in-part of application No. 13/687,470, filed on Nov. 28, 2012, now Pat. No. 9,623,769.

(60) Provisional application No. 61/564,563, filed on Nov. 29, 2011.

(51) Int. Cl.
    *B60N 2/14* (2006.01)
(52) U.S. Cl.
    CPC .............. *B60N 2/14* (2013.01); *B60N 2/146* (2013.01)
(58) Field of Classification Search
    CPC ....... F16H 37/126; F16H 37/12; B60N 2/146; B60N 2/14

USPC .... 248/349.1, 416, 415, 417, 418, 424, 425, 248/419, 40, 186.1, 186.2, 279.1, 285.1; 297/344.22, 344.24, 344.26

See application file for complete search history.

(56) References Cited

U.S. PATENT DOCUMENTS

| | | | |
|---|---|---|---|
| 2,290,464 | A | 7/1942 | Buchheit |
| 2,809,690 | A | 10/1957 | Walther et al. |
| 2,992,852 | A | 7/1961 | Loofbourrow et al. |

(Continued)

FOREIGN PATENT DOCUMENTS

FR    2776583 A1 * 10/1999 ............. B60N 2/146

OTHER PUBLICATIONS

U.S. Appl. No. 13/687,470, filed Nov. 28, 2012.

*Primary Examiner* — Kimberly T Wood
(74) *Attorney, Agent, or Firm* — Barnes & Thornburg LLP (57) ABSTRACT

A seat pedestal includes an open base upon which a plate assembly is mounted for translational movement upon the base. The plate assembly includes a bottom plate, a seat mount for supporting a seat, and a bearing means between the bottom plate and the seat mount to permit the seat mount to rotate. One lock releasably secures the plate assembly in the driving position and another, which is self-actuating, releases the seat mount so that it can rotate freely when it is in the resting position. A stop carried by the seat mount defines a range in which the seat may be rotated. At least one pair of interlocking members couples the seat mount with the bottom plate to transfer lateral loads born by the seat to the base. The bottom plate, the bearing means, and the seat mount have concentric openings through which wires may pass for accessories such as power/heated seats, headrests, and computer screens and related accoutrements.

21 Claims, 11 Drawing Sheets

(56) References Cited

U.S. PATENT DOCUMENTS

| | | |
|---|---|---|
| 3,051,522 A | 8/1962 | Myers |
| 3,394,964 A | 7/1968 | Humphries |
| 3,572,817 A | 3/1971 | Colautti |
| 3,821,825 A | 7/1974 | Bailey |
| 3,834,660 A | 9/1974 | Leffler |
| 3,860,283 A | 1/1975 | Colautti |
| 4,122,571 A | 10/1978 | Moeser |
| 4,155,593 A | 5/1979 | Swenson et al. |
| 4,401,287 A | 8/1983 | Moeser |
| 4,570,997 A | 2/1986 | Tanizaki et al. |
| 4,705,256 A | 11/1987 | Hofrichter |
| 4,802,708 A | 2/1989 | Vos et al. |
| 4,805,952 A * | 2/1989 | Coleman ............ B60N 2/01541 248/503.1 |
| 5,149,092 A | 9/1992 | Parsons |
| 5,482,354 A | 1/1996 | Gryp |
| 5,720,462 A | 2/1998 | Brodersen |
| 5,778,804 A * | 7/1998 | Read ................... A47B 13/021 248/221.12 |
| 6,021,989 A | 2/2000 | Morita et al. |
| 6,447,065 B1 | 9/2002 | Ropp |
| 2002/0023995 A1 | 2/2002 | Yoshida et al. |
| 2003/0160488 A1 | 8/2003 | Kim |
| 2007/0222267 A1 | 9/2007 | Tsujimoto et al. |
| 2009/0127908 A1 | 5/2009 | Kucharski et al. |

\* cited by examiner

SEAT PEDESTAL

REFERENCE TO RELATED APPLICATION

This application is a Continuation-in-Part of copending U.S. patent application Ser. No. 13/687,470, filed Nov. 28, 2012, which claims benefit of priority of U.S. Provisional Patent Application No. 61/564,653, filed Nov. 29, 2011, the contents of which are hereby incorporated by reference in their entireties.

FIELD OF THE INVENTION

The invention relates generally to articles of furniture and, more particularly, to a seat pedestal.

BACKGROUND OF THE INVENTION

Swivel chairs have become popular. Because such chairs often have large backs, arms and cushions, however, they are difficult to operate in restricted spaces such as vehicles. There is, therefore, a need for an improved seat pedestal. A seat pedestal that not only swivels, but one capable of allowing the seat's axis of rotation to be relocated to a roomier area away from walls and obstructions before swiveling is especially desirable. Such movement of the axis, other than to and fro, is especially desirable in vehicle as well as non-vehicle settings.

SUMMARY OF THE INVENTION

The present invention relates to a seat pedestal that includes a base with a top and a plate assembly connected to the top of the base by a connector. The plate assembly includes a bottom plate, a seat mount for supporting a seat, and a bearing means between the bottom plate and the seat mount to permit the seat mount to rotate about a center axis relative to the bottom plate. The connector is adapted for permitting translational movement of the bottom plate, the seat mount and the bearing means as a single unit upon the top of the base between a driving position, a resting position and therebetween.

In another aspect of the invention, a lock is provided for releasably securing the bottom plate in the driving position.

In another aspect, a self-actuating pin lock locks the seat mount to the bottom plate so that the seat mount may not rotate freely when the plate assembly is in the driving position. The pin lock is also self-actuating for releasing the seat mount from the bottom plate so that the seat mount may rotate freely about the plate assembly's center axis when the plate assembly is in the resting position.

In another aspect, the seat mount carries at least one stop configured to define a range of seat mount rotation about the center axis when the seat is in the resting position.

In still another aspect, at least one pair of interlocking members is provided for coupling the seat mount with the bottom plate to transfer lateral loads born by the seat to the base.

In yet another aspect, a stop plate is supported above the seat mount and connected with the bottom plate such that the stop plate, the bottom plate, the seat mount and the bearing means can move translationally as a single unit relative to the base. The stop plate includes abutments for contacting the stop to define a range of rotation of the seat mount about the axis.

One object of the invention is to provide an improved seat pedestal, which pedestal not only swivels, but is capable of allowing the seat's axis of rotation to be relocated translationally from its base, that is, the seat may be moved in a direction other than to and fro before swiveling. Related objects and advantages of the invention will be apparent from the following description.

BRIEF DESCRIPTION OF THE DRAWINGS

The details of the invention, both as to its structure and operation, may be obtained by a review of the accompanying drawings, in which.

DETAILED DESCRIPTION OF INVENTION

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention pertains.

Referring to the Figures, a seat pedestal 10 for a vehicle seat 12 includes a base 20 and a plate assembly 30 connected to the top 22 of the base by a connector 60. The plate assembly 30 includes a bottom plate 32, a seat mount 42 for supporting a seat, and a stop plate 52 with peripheral abutments 51. The bottom plate 32 and the seat mount 42 each has an opening 31, 41. A bearing means 112 is located between the bottom plate 32 and the seat mount 42 to permit the seat mount to rotate about a center axis 43 relative to the bottom plate 32 and base 20.

In this description "bearing means" shall mean any of various machine elements or surfaces that allow or promote free rotation about a fixed axis.

Figure 2:
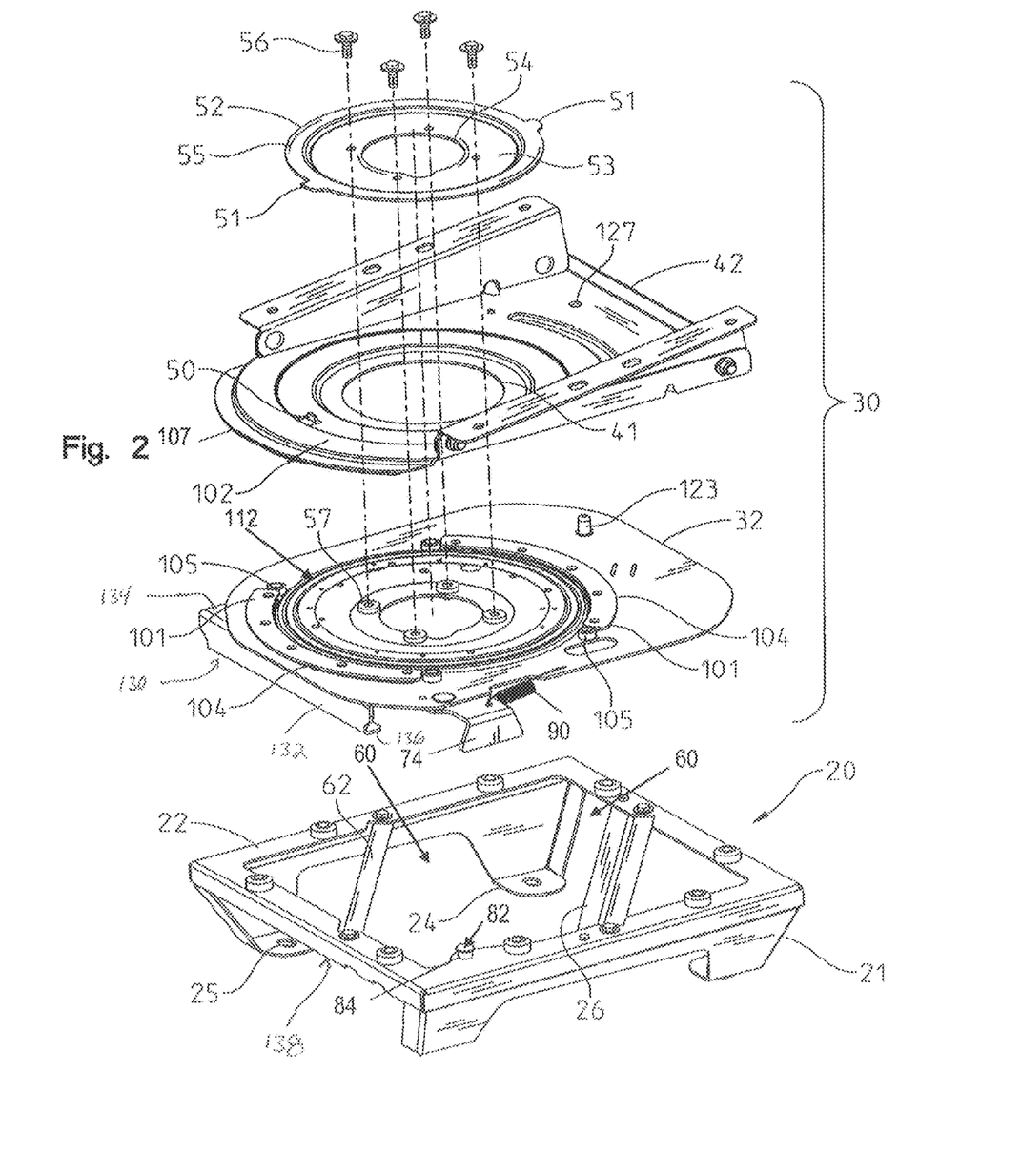
FIG. 2 is an exploded perspective view of an embodiment of the invention showing the plate assembly disassembled from the base.

The connector 60 is adapted for permitting translational movement of the bottom plate 32, the seat mount 42 and the bearing means 112 as a single unit upon the top 22 of the base 20 from a driving position (FIG. 6A) to a resting position (FIG. 6B) and therebetween. In the embodiment illustrated, the base 20 includes an open frame supported by four legs 21. Each of the legs may, optionally, be adapted for mounting to the floor of a vehicle, as shown in FIG. 2. In that embodiment, each of the legs includes an inwardly facing planer toe 24 with a bore 25 for receiving an anchoring bolt for securing the base to the floor. Attached at their respective ends to the sides of the base 20, a cam bracket 26 and connector support bar 62 span across the open frame for supporting and operating the connector 60 and the pin lock 120, as described below.

The base 20 and the components of the plate assembly 30 and connector 60 are preferably formed from a rigid metal, such as steel, metal alloy, or the like. Components of the invention are formed using known metal working techniques, including rolling, pressing, lathe and stamping processes. Additional mechanical structures described below are formed, shaped and assembled using known methods and secured to the base 20, bottom plate 32, or seat mount 42 using known fastening means, including bolts, screws, welds and the like. In some embodiments, plastic may be used to mold or otherwise form the base 20 as well as the components comprising some or all of the plate assembly 30. Obviously, vehicular and other safety standards, technologies available, preferred physical properties based on the application, e.g., vehicular, non-vehicular, and cost may drive the type of materials used from which to form the base 20 and the components of the plate assembly 30.

In one embodiment, the connector 60 includes at least one slide support bar 62 connected to the base and at least one sliding tube 64 carried by the underside of the bottom plate 20. The bar 62 is made to slide within the tube 64. Skilled artisans should recognize that various other mechanical and electromechanical substitutes may be used as a connector 60. Examples may include male/female interlocking tracks, gears, a sprocket or cogwheel with a belt or a chain-driven assembly. A wheel with teeth adapted to drive mechanical movement along a track having spaced grooves or apertures that receive the teeth serves as another example. Pneumatic and closed fluid systems using piston and cylinder assemblies are also contemplated for adaptation as a connector 60 for connecting the plate assembly 30 to the base 20 and for facilitating translational movement as herein described.

Figure 1:
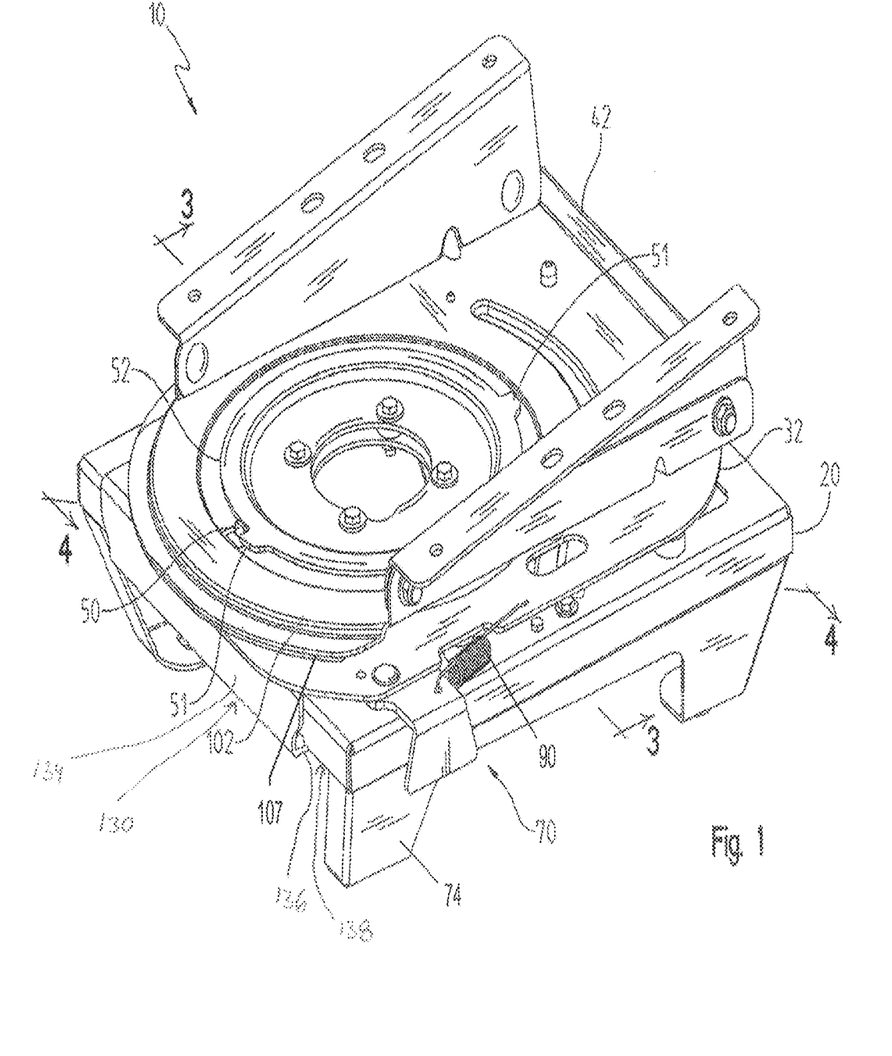
FIG. 1 is an isometric view of an embodiment of the present invention.
Figure 5:
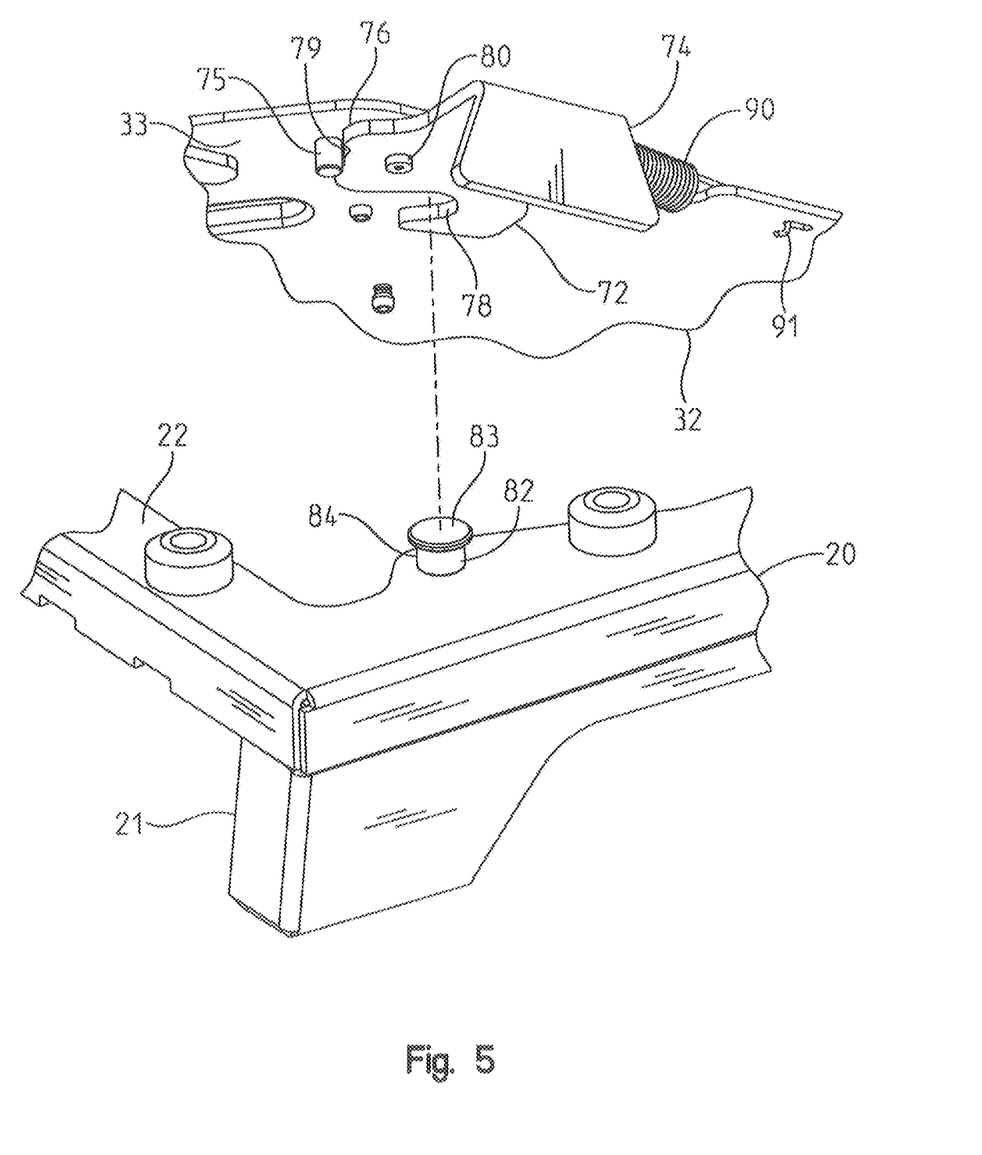
FIG. 5 is a partial-cutaway enlarged view showing the lock of the invention.

With reference to FIGS. 1 and 5, a lock mechanism 70 has a handle 74 that extends outwardly from between the plate assembly 30 and base 20, as shown in FIG. 5. A pin 82 with a shaft 84 and a head 83 extends upwardly from the top 22 of the base 20. A flat body 72 carried by the underside 33 of the bottom plate 32 pivots at pivot 80. In the embodiment illustrated, the body 72 comprises a side index portion 76, which rides against the downwardly extending pin 75 to be captured in the hold 79 to provide a self-locking feature of the invention when the plate assembly 30 is moved from the resting position into the driving position. A cradle portion 78 is formed in the body 72 for surrounding the shaft 84 of the pin 82 to releasably secure the plate assembly 30 in the driving position. A coil spring 90 is connected at one end 91 to the bottom plate 32 and to the body 72 at its other end for constantly urging the cradle portion 78 against the pin 82.

Figures 6A, 6B, 6C:
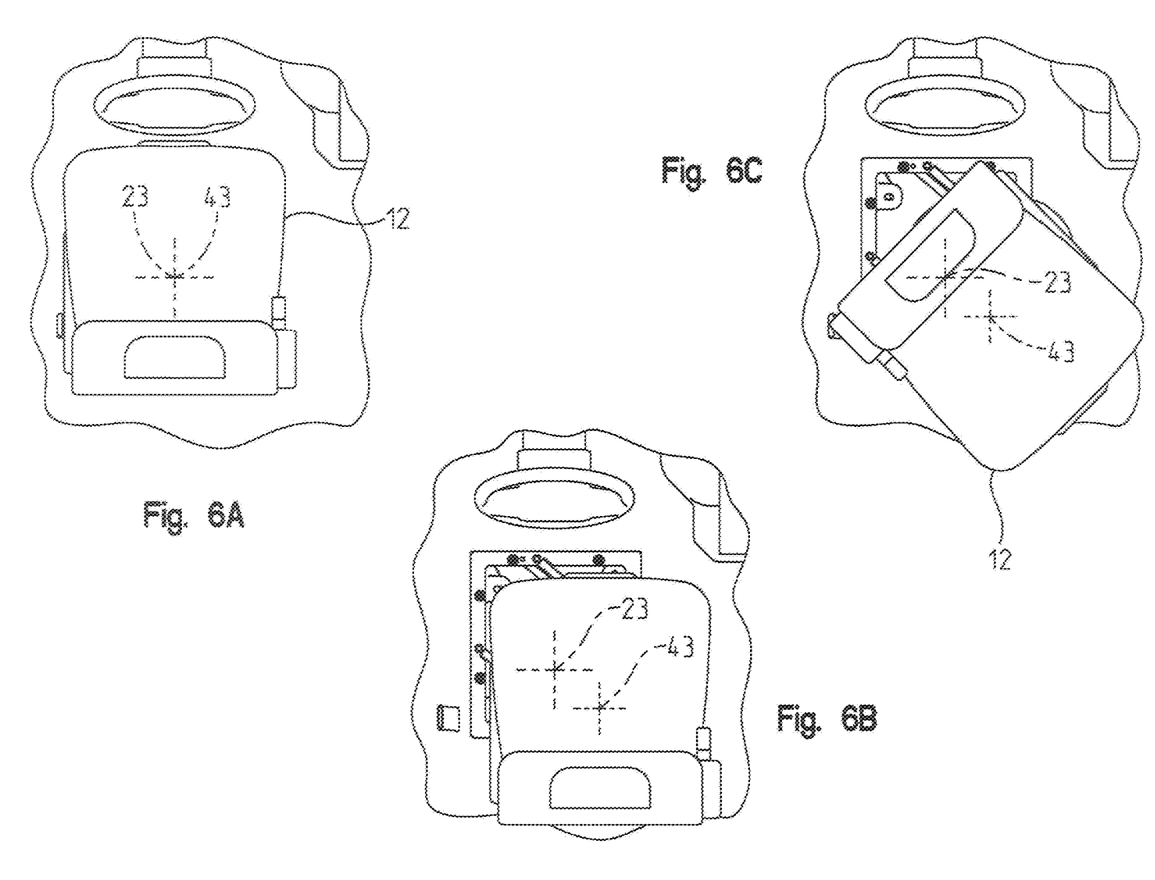
FIG. 6A is a top partial-cutaway schematic view of the driver's side of a vehicle compartment showing a seat carried by the seat pedestal of the invention in the driving position. The center axes of the base and the plate assembly are located at the same point.
FIG. 6B is the seat of FIG. 6A shown in the resting position.
FIG. 6C is the seat of FIG. 6B shown rotated to face generally toward the rear and the interior of the vehicle compartment.

In use, upon releasing the lock 70 via handle 74, the seat occupant or another person may move the seat including the plate assembly 30, via the connector 60 translationally relative to the base 20. Thus, the center axis 43 of the plate assembly is relocated from the center axis 23 of the base 20, as shown in FIGS. 6A-6B. The seat mount 42 and thus, the seat 12 rotates or swivels by way of the bearing means 112. Skilled artisans should recognize that any of various machine elements or surfaces that allow or promote free rotation about a fixed axis may be used as a bearing means between the seat mount 42 and bottom plate 32. Male/female interlocking components, assemblies whose surfaces are adapted to slide one upon another, and mechanical structures that sandwich ball bearings are non-limiting examples of such bearing means.

Figure 3:
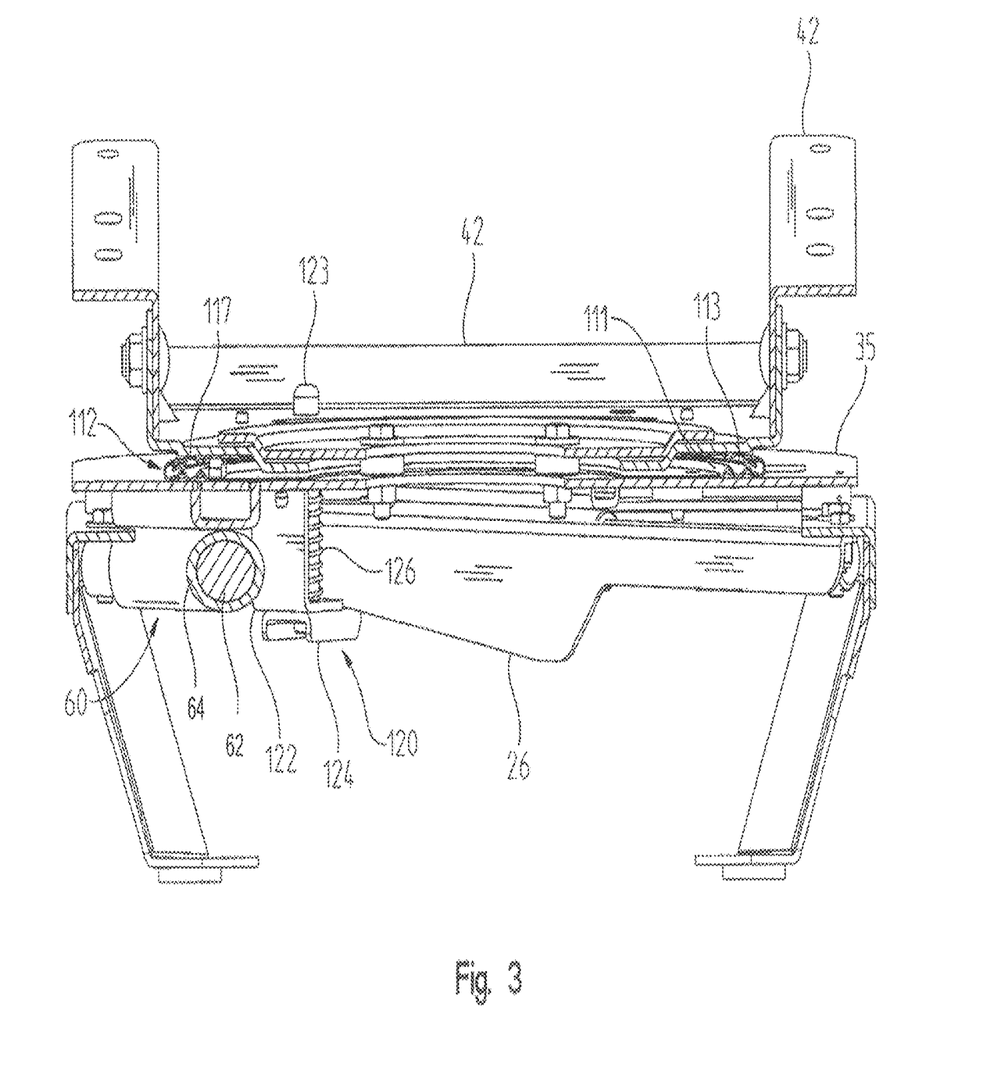
FIG. 3 is a cross-section of the embodiment of the seat pedestal of FIG. 1 taken along line 3-3 of FIG. 1 showing the cam bracket, the pin lock, the slide support bar and sliding tube.

In the embodiment illustrated, a first element 111 fastened to the top side 35 of the bottom plate 32 is complementarily shaped to receive at least a portion of a second element 117 carried by the under side of the seat mount 42, as shown in FIG. 3. The elements 111, 117 may be separate specially shaped plates secured to their respective surfaces or the elements may be integrally formed in their respective surfaces. In the embodiment shown in FIG. 3, the two elements 111, 117 are generally closed rings having cross sections that are generally in the shape of an S or Z. When the elements 111, 117 are assembled together, at least a portion of the second element 117 is overlapped or received by the first element 111. The tolerances between the elements are such as to permit rotation of second element 117 within the first.

Figure 10A:
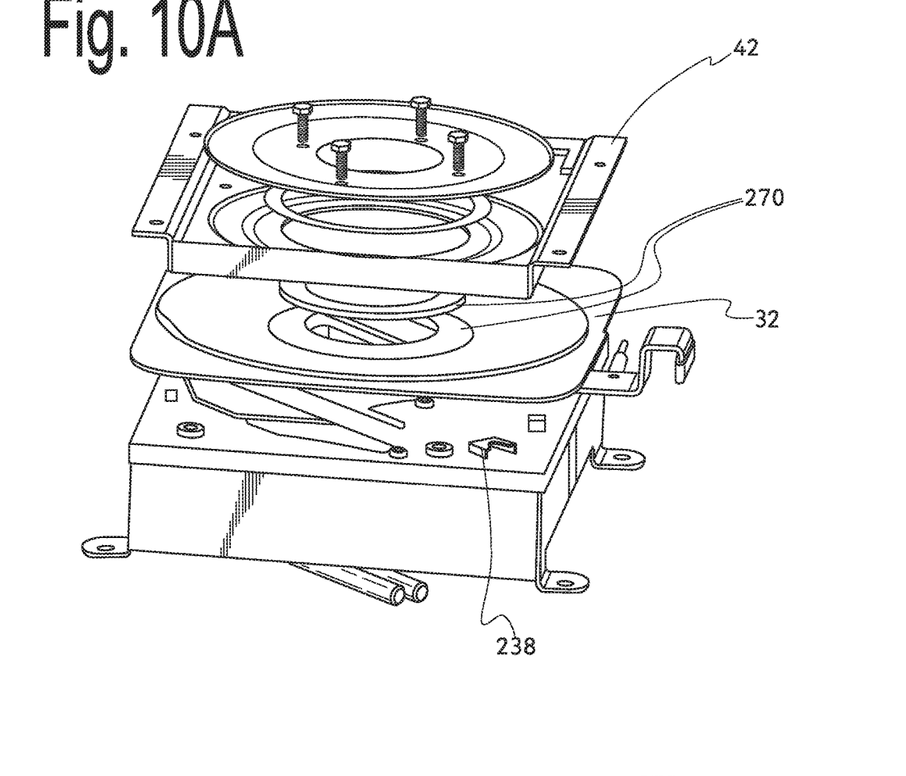
FIG. 10A is an exploded view of a seat pedestal including plastic bearings between a bottom plate and a seat mount thereof according to the present disclosure.
Figure 10B:
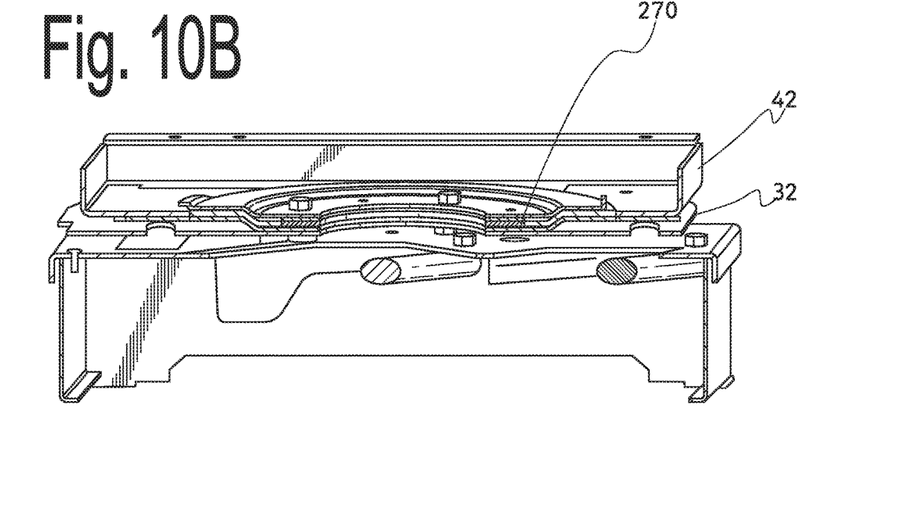
FIG. 10B is a cut-away view of the seat pedestal of FIG. 10A.

In one embodiment, when assembled, the elements 111, 117 define a space 113, in which ball bearings (not shown) may reside. In another embodiment, elements 111, 117 fit together in the manner as described above and may not use or require ball bearings. For example, in the embodiment shown in FIGS. 10A and 10B, the bearing means may be embodied as one or more plastic bearings 270 disposed between the seat mount 42 and the bottom plate 32. Such plastic bearings 270 may be made of any suitable plastic material having a surface sufficiently smooth to act as a bearing surface. For example, such plastic bearings 270 may be made of DELRIN®, nylon, or another plastic material. Such materials may or may not be inherently lubricious or coated with a lubricious material.

The seat mount 42 carries at least one stop 50 configured to define a range of seat mount rotation about the center axis 43 when the seat is in the resting position, as shown in FIGS. 6B-6C. A stop plate 52 is supported above the seat mount 42. In one embodiment, the stop plate comprises a generally round body with a depressed central area 53 with an opening 54 and a peripheral lip 55. The depressed central area of plate 52 and its fit within the central part of the seat mount 42 also contributes to the pedestal's ability to absorb lateral forces. Oppositely disposed abutments 51 or ears extend outwardly from the periphery of the lip 55.

Figure 4:
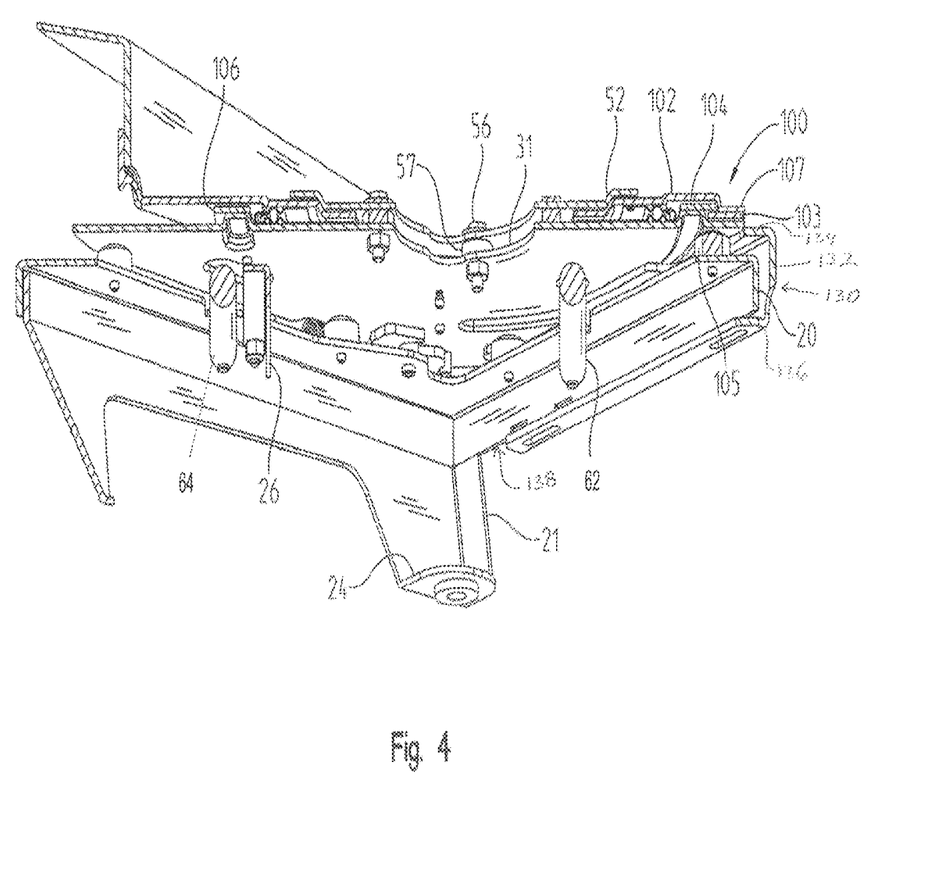
FIG. 4 is a cross-section of the embodiment of the seat pedestal of FIG. 1 taken along line 4-4 of FIG. 1 showing the bearing means and the interlocking members.

The stop plate 52, preferably, is bolted to the bottom plate 32 with bolts 56, and spacers 57 are positioned on the top surface of the bottom plate 32, as illustrated in FIGS. 2 and 4. Spacers 57 provide a space between the stop plate 52 and the bottom plate 32 within which the seat mount may freely rotate without surface-to-surface contact therebetween. In the embodiment illustrated, however, the range of rotation of the seat mount 42 about axis 43 is defined when the abutments 51 contact the stop 50, as best shown in FIG. 1.

The complementary shapes of the central portions of the stop plate 52 and the seat mount 42, as best depicted in FIG. 3, prevent "chucking," that is, rocking of the seat that commonly occurs in the prior art caused by lateral loads delivered to the seat over time. Additionally, their corresponding openings 41, 54 also allow wires to pass and be concealed so that accessories such as power/heated seats, headrests, and computer screens and related accoutrements can be used with the seat pedestal 10.

Referring to FIG. 1-4, interlocking members 100 couple the seat mount 42 with the bottom plate 32. An arcuate-shaped member 102 carried by the underside 33 of the seat mount 42 and at least one other arcuate-shaped member 104 on a top side 35 of the bottom plate 32 interlock. Preferably, one of the members is adapted to encapsulate the other of the members when the seat mount is in the driving position, the resting position, or therebetween, including when the seat mount rotates so that lateral loads born by the seat 12 may be transferred to the base 20. Hence, in one embodiment, the arcuate-shaped member 102 comprises a tongue 107 (FIG. 4), which may be an additional metal piece welded to the underside of member 102 to define an overhang 103 or member 102 folded back onto itself.

In one particular embodiment, with reference to FIGS. 1-2 and 4, bumpers, or rollers 105 located at both ends of the members 104 may, or may not, be adapted to freely rotate upon engagement of the arcuate member 102 as it is rotatably carried by the seat mount 42 when the seat mount rotates about axis 43. Rollers/bumpers 105 may be formed from a rigid metal, plastic or various known materials that resist wear and friction. One example is TEFLON. Rollers 105 guide and ease movement of the arcuate-shaped member 102 so that the overhang 103 of the arcuate-shaped member 102 aligns with and encapsulates the edge 106 of the arcuate-shaped member 104 on the top side 35 of the bottom plate 32. In this manner, lateral loads born by the seat 12 may be transferred to the base 20 when the seat mount is in the driving position, the resting position, or therebetween.

Referring to FIG. 3, another lock, a pin lock 120 prevents the seat from freely rotating when it is in the driving position. The pin lock 120 includes a frame 122, a pin 123 and an elongated base 124 that carries the pin. The pin and base 123, 124 are movable up and down relative to the frame permitting the pin 123 to penetrate a bore 127 (FIG. 2) that extends through the seat mount 42. A coil spring 126 encircling the pin resides between the base 124 and a top seating portion of the frame, which is obscured in the view of FIG. 3. The spring 126 constantly urges the base 124 and thus the pin and the top of the frame 122 apart.

The pin lock 120 is secured to the bottom plate 32 and thus moves translationally with the plate assembly 30 from the driving position to the resting position, as shown in FIGS. 6A-6B. As the seat is moved, the elongated base 124 of the pin lock 120 travels against the cam bracket 26 and incrementally relaxes spring 126 drawing pin 123 downward through bore 127. In this manner, the pin lock 120 is self-actuating. Hence, the pin is made to incrementally ascend into the bore 127 in the seat mount 42 and prevent its rotation as the base 124 is cammed upward along the slope of the bracket 26 upon returning the seat from the resting position to the driving position.

The pedestal is scalable to multiple platforms for meeting a broad range of OEM seat options, including the front driver and passenger positions of the same. Additionally, the inventors contemplate an apparatus like that shown in the drawings whose translational as well as rotational movement is driven using known electromechanical components with controls for operating the movement of the plate assembly. In that embodiment, the controls may be installed in the seat 12, the pedestal 10 or in the console of, for example, a vehicle. Of course, RF transceivers may be electrically connected to the mechanical parts described herein so that operation of the seat may be by way of a hand held electronic device as well.

As shown schematically in FIGS. 6A-6C, the new pedestal may be used to support and carry a seat mounted in a vehicle, e.g., recreational or other vehicle, where it may be desirable to orient the seat toward the rear of the vehicle. The seat pedestal 10 has application in any tight, confined space whether the space is defined by a building structure or whether it is mobile, as in a vehicle. The pedestal provides for seat movement rearward and inboard to clear vehicle pillars, steering wheel and, in some cases, the engine cover, then swivels about its relocated center axis 43.

As best shown in FIGS. 1, 2, and 4, an encapsulator 130 is attached to the bottom plate 32 of the plate assembly. In an embodiment, the encapsulator could be monolithically formed with the bottom plate 32. As shown, the encapsulator 130 is a channel having a generally vertical web 132, a first (or upper), generally horizontal flange 134 extending from a first end of the web and a second (or lower), generally horizontal flange 136 extending from a second end of the web. The upper flange 134 of the encapsulator 130 is connected to the lower surface of the bottom plate 32. The lower flange 136 of the encapsulator 130 is configured to engage with a lower edge 138 of the base 20 in overlapping engagement therewith when the plate assembly 32 is in the driving position. In an embodiment, the encapsulator 130 could be monolithically formed with the bottom plate 32, rather than discretely formed and post attached thereto, as described above. In any event, the engagement of the encapsulator 130 with the base 20 provides a further impediment to separation of the plate assembly 30 from the base 20, for example, in response to a collision.

Figure 7:
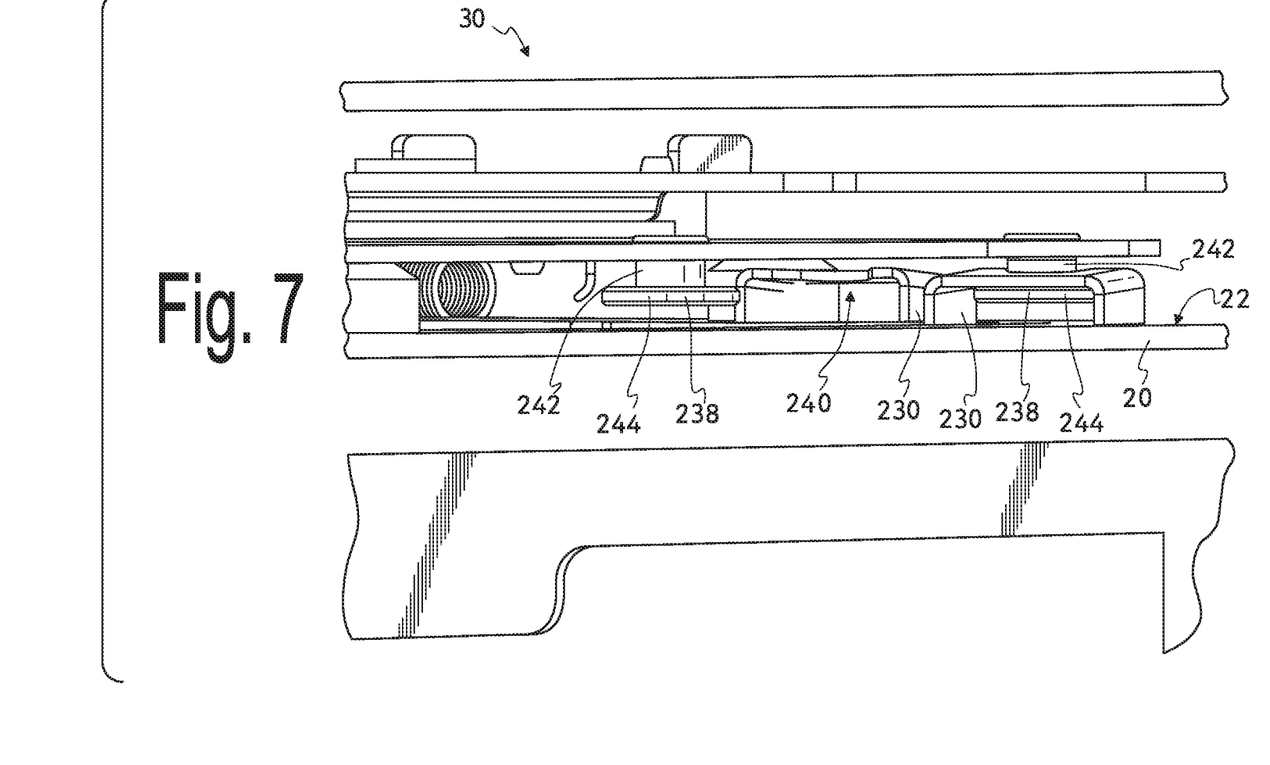
FIG. 7 is an enlarged view of portion of an alternative base and plate assembly according to the present disclosure.
Figure 8:
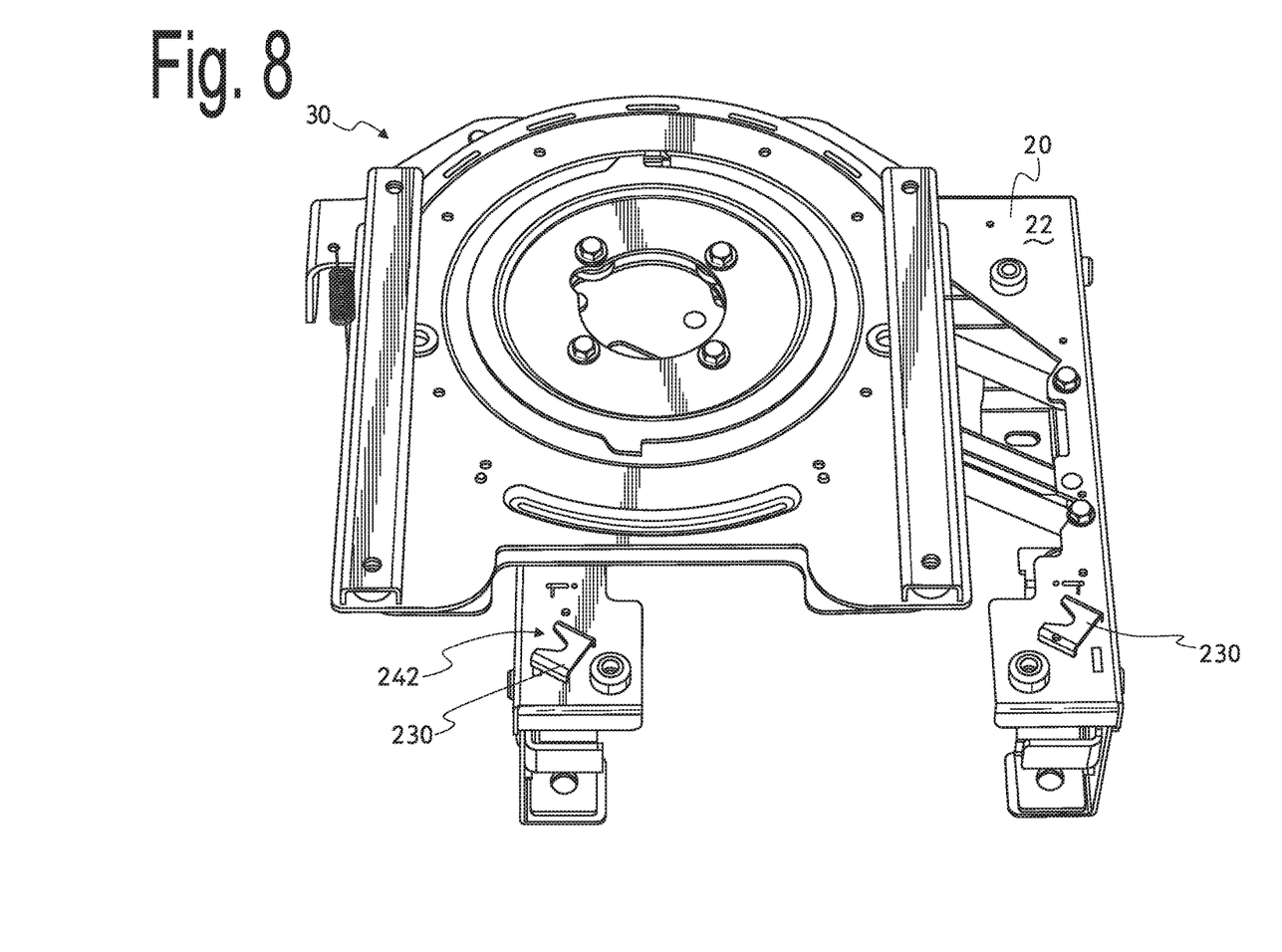
FIG. 8 is a perspective view of a seat pedestal having an alternative base and plate assembly according to the present disclosure.

In another embodiment, shown in FIGS. 7 and 8, a plurality of encapsulators 230 and corresponding engagement members 238 may be provided instead of or in addition to the encapsulator 130 to further secure the plate assembly 30 to the base 20 in one or both of the driving position and the resting position. In the illustrated embodiment, the encapsulators 230 are connected to the base 20 and the corresponding engagement members 238 are connected to the bottom plate 32 or to another portion of the plate assembly 30. In another embodiment, the positions of the encapsulators 230 and the engagement members 238 could be reversed. That is, the encapsulators 230 could be connected to the bottom plate 32 or to another portion of the plate assembly 30 and the corresponding engagement members 238 could be connected to the base 20.

Each of the encapsulators 230 is shown as a U-shaped channel having a web generally parallel to the top 22 of the base 20 and two flanges depending from the web. The flanges are shown as being generally perpendicular to the web, but they could be oriented in other ways, for example, splayed outwardly with respect to the web. The free ends of the flanges are connected to the top 22 of the base 20. The web defines a U-shaped slot 240 having an axis parallel to the direction in which the plate assembly 30 is slidable with respect to the base 20.

Each of the engagement members 238 is configured as a rivet or rivet-like structure having a shank 242 and a head 244. The free end of the shank 242 is connected to the bottom plate 32 and the other end of the shank is connected to the head 244 such that the head is spaced from and generally parallel to the bottom plate 32.

Each encapsulator 230 is configured to selectively engage with a corresponding engagement member 238 so that the shank 242 of the engagement member is received in the slot 240 of the encapsulator and the head 244 of the engagement member axially captured between the web of the encapsulator and the bottom plate 32. The engagement member 238 may be disengaged from the corresponding encapsulator 230 by laterally displacing the engagement member from the encapsulator.

Although the web of each encapsulator 230 is described above as being generally parallel to the top 22 of the base 20, as best shown in FIG. 7, the web may be slightly inclined so that the portion of the web proximate the open end of the slot 240 is slightly farther from the top of the base than the portion of the web proximate the closed end of the slot. This geometry facilitates initial engagement of the encapsulator 230 with the corresponding engagement member 238 and promotes tight (for example, playless) engagement of the encapsulator and the corresponding engagement member by drawing the engagement member axially toward the top 22 of the base 20 as the engagement member is fully received laterally in the slot 240. Alternatively, the web of the encapsulator 230 may be generally parallel to the top 22 of the base 20, and the head 244 of the engagement member 238 may be wedge-shaped to facilitate engagement with the encapsulator 230 in a similar manner to yield a similar result. As another alternative, the peripheral edge of the surface of the head 244 facing the bottom plate 32 may be beveled to facilitate engagement with the encapsulator 230 in a similar manner to yield a similar result.

A first set of encapsulators 230 and corresponding engagement members 238 including as few as one of each, or two or three or more of each, could be configured for engagement with each other with the plate assembly 30 in the driving position. A second set of encapsulators 230 and corresponding engagement members 238 including as few as one of each, or two or three or more of each, could be configured for engagement with each other with the plate assembly 30 in the resting position. See, for example, FIG. 7, wherein the left-most encapsulator 230 and corresponding engagement member 238 are configured for engagement with each other when the plate assembly 30 is in the resting position, and wherein the right-most encapsulator and engagement member are configured for engagement with each other when the plate assembly is in the driving position.

In an embodiment (not shown), a given engagement member 238 could correspond to and two encapsulators 230. That is, a given engagement member 238 could be configured to engage with a first encapsulator 230 with the plate assembly 30 in the driving position, and also to engage with a second encapsulator with the plate assembly in the resting position.

Figure 9A:
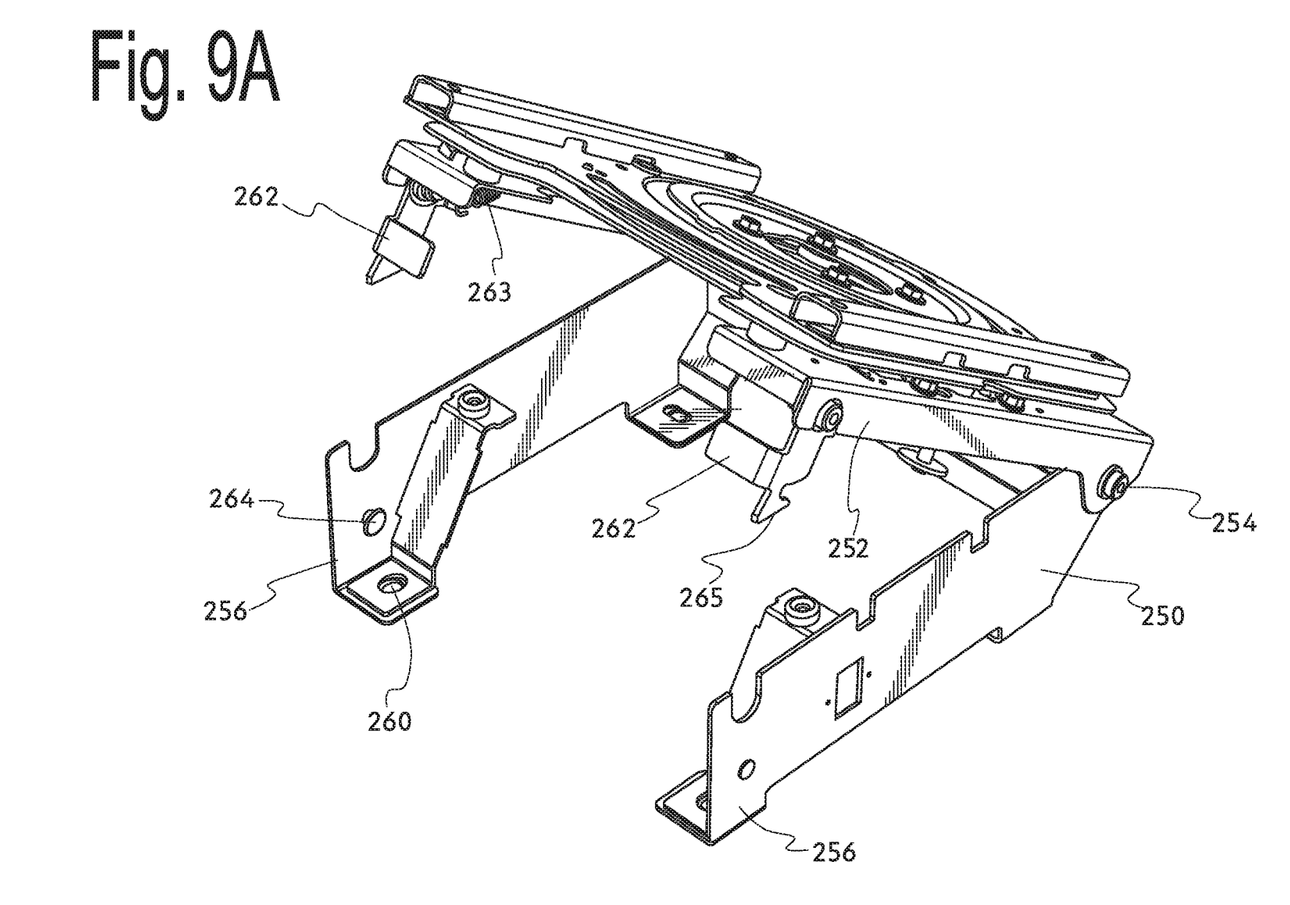
FIG. 9A is a perspective view of a seat pedestal including a base having a vehicle mounting portion and a connector mounting portion pivotally connected to the vehicle mounting portion, with the connector mounting portion pivoted with respect to the vehicle mounting portion.
Figure 9B:
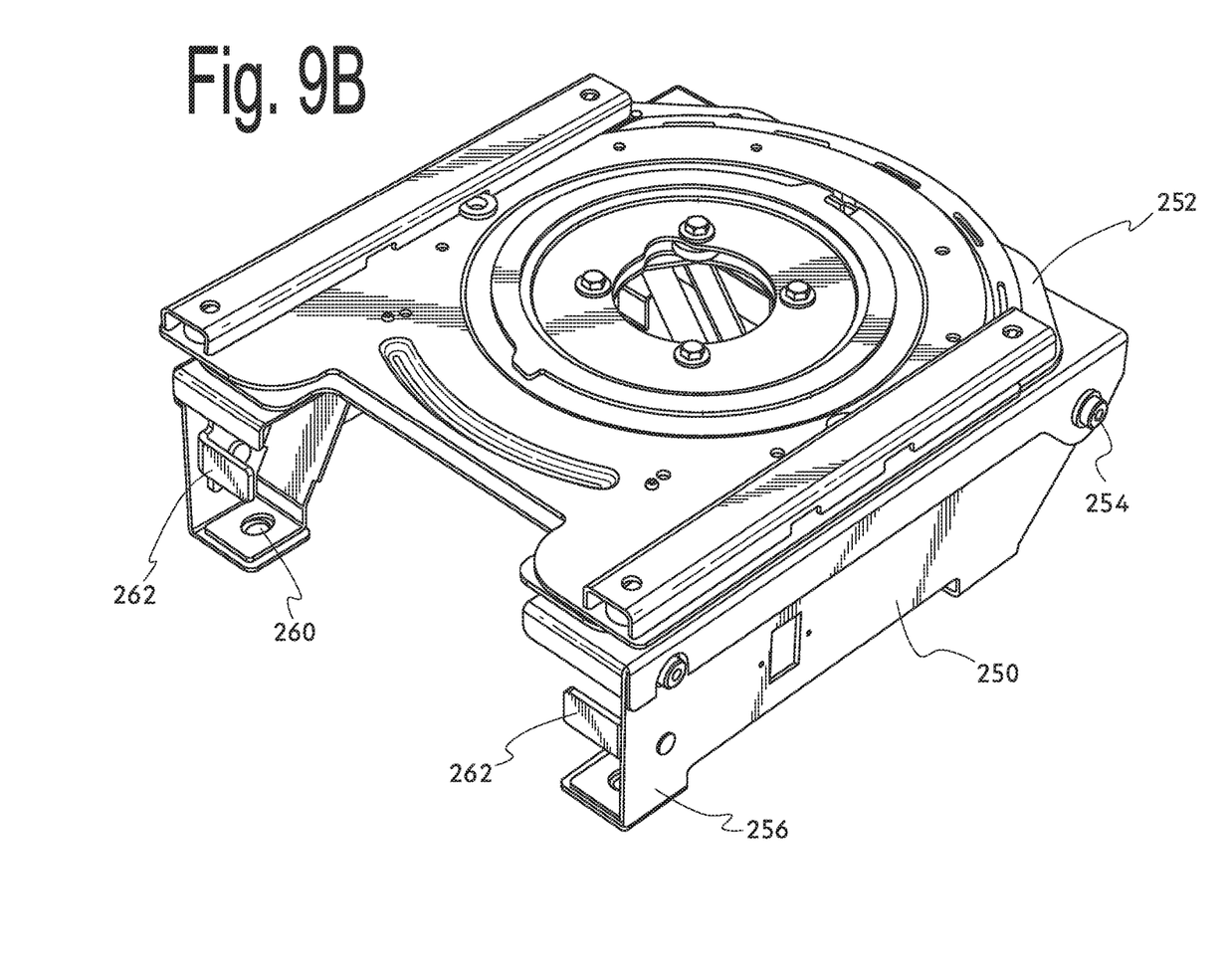
FIG. 9B is a perspective view of the seat pedestal of FIG. 9A with the connector mounting portion latched to the vehicle mounting portion.

In an embodiment, as shown in FIGS. 9A-9C, the base 20 may include a vehicle mounting portion 250 and a connector mounting portion 252. The vehicle mounting portion 250 may include one or more legs 256 having a planar toe 258 defining a bore 260 configured to receive a mechanical fastener for securing the vehicle mounting portion to a vehicle (or other structure). The connector mounting portion 252 may be pivotally connected to the vehicle mounting portion 250, for example, by one more pivot pins 254. With the vehicle mounting portion 250 secured to the vehicle (or other structure), the connector mounting portion 252 may be pivoted with respect to the vehicle mounting portion to permit access to the space underneath the connector mounting portion.

The connector mounting portion 252 may include one more latches 262 configured for engagement with corresponding engagement members 264 on the vehicle mounting portion 250. Each latch 262 may be spring-loaded or otherwise biased to a latched position, as shown in FIGS. 9A-9B. For example, a coil tension spring 263 (as shown in FIG. 9A) may be connected between the latch 262 and the connector mounting portion 252 as best shown in FIG. 9B. Each latch 262 may include a cradle portion similar to the cradle portion 78 of the lock mechanism 70 discussed above configured for selective engagement with the corresponding engagement portion 264.

With the connector mounting portion 252 latched to the vehicle mounting portion 250, an external force may be applied to the latch to displace it from the latched position, thereby enabling pivoting of the plate mounting portion with respect to the vehicle mounting portion.

With the connector mounting portion 252 pivoted away from the vehicle mounting portion 250, the connector mounting portion may be latched to the vehicle mounting portion by simply pivoting the connector mounting portion to the vehicle mounting portion. Each latch 262 may have a cam surface 265 configured to deflect the latch away from the engagement member 264 as the connector mounting portion 252 approaches the vehicle mounting portion 250 and the latch comes into initial contact with the engagement member. Once the cam surface has passed the shank of the engagement member, the biasing force acting on the latch member returns the latch to the latched position where it fully engages with the engagement member, thereby releasably securing the connector mounting portion 252 to the vehicle mounting portion 250.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make an infinite number of insubstantial changes and modifications to the above-described embodiments and that it would not be practical to attempt to describe all such embodiment variations in the present specification. Accordingly, it is understood that all changes and modifications that come within the spirit of the invention are desired to be protected.

What is claimed is:

1. A seat pedestal for supporting a seat, the seat pedestal comprising:
   a base, the base comprising a top;
   a plate assembly connected to the top of the base, the plate assembly comprising a bottom plate, a seat mount for supporting a seat, a bearing between the bottom plate and the seat mount to permit the seat mount to rotate about a center axis relative to the bottom plate and base; and
   a connector connected to the base and to the plate assembly, the connector being configured to permit translational movement of the plate assembly as a single unit upon the top of the base between a driving position and a resting position with respect to the base;

wherein the base further comprises a plurality of encapsulators extending from the top of the base toward the bottom plate;

wherein the plate assembly further comprises a plurality of engagement members extending from the bottom plate toward the top of the base; and wherein one of the plurality of encapsulators engages one of the plurality of engagement members when the plate assembly is in the driving position.

2. The seat pedestal of claim 1 wherein the one of the plurality of encapsulators engages another one of the plurality of engagement members when the plate assembly is in the resting position.

3. The seat pedestal of claim 1 wherein another one of the plurality of encapsulators engages another one of the plurality of engagement members when the plate assembly is in the resting position.

4. The seat pedestal of claim 1 wherein another one of the plurality of encapsulators engages with another corresponding one of the plurality of engagement members when the plate assembly is in the driving position.

5. The seat pedestal of claim 1 wherein at least one of the plurality of encapsulators comprises a channel having a web, the web defining a slot having an open end and a closed end, and first and second flanges extending from the web and connected to the top of the base, wherein at least one of the engagement members comprises a shank having a first end and a second end, the first end connected to the bottom plate and a head connected to the second end, and wherein the shank is selectively receivable within the slot, and the head is selectively receivable between the web and the top of the base.

6. The seat pedestal of claim 5 wherein the web is generally parallel to the top of the base.

7. The seat pedestal of claim 6, wherein the head of the engagement member is wedge shaped or wherein a peripheral edge of a surface of the head of the engagement member facing the bottom plate is beveled.

8. The seat pedestal of claim 7 wherein lateral displacement of the engagement member from the open end of the slot to the closed end of the slot causes axial displacement of the engagement member toward the top of the base.

9. The seat pedestal of claim 8 wherein lateral displacement of the engagement member from the open end of the slot to the closed end of the slot causes the engagement member to become wedged between the web and the top of the base.

10. The seat pedestal of claim 5 wherein the web is inclined with respect to the top of the base, with the open end of the slot farther from the top of the base than the closed end of the slot.

11. The seat pedestal of claim 10 wherein lateral displacement of the engagement member from the open end of the slot to the closed end of the slot causes axial displacement of the engagement member toward the top of the base.

12. The seat pedestal of claim 11 wherein lateral displacement of the engagement member from the open end of the slot to the closed end of the slot causes the engagement member to become wedged between the web and the top of the base.

13. The seat pedestal of claim 1, further comprising a lock for releasably securing the bottom plate in the driving position.

14. The seat pedestal of claim 1, further comprising a pin lock for releasably securing the seat mount to the bottom plate such that the seat mount may not rotate freely.

15. The seat pedestal of claim 1, the base further comprising a vehicle mounting portion and a connector mounting portion pivotally connected to the vehicle mounting portion, the connector portion comprising the top of the base.

16. The seat pedestal of claim 1, wherein the bearing comprises at least one plastic bearing disposed between the seat mount and the bottom plate.

17. A seat pedestal for supporting a seat, the seat pedestal comprising:

a base, the base comprising a top;

a plate assembly connected to the top of the base, the plate assembly comprising a bottom plate, a seat mount for supporting a seat, a bearing between the bottom plate and the seat mount to permit the seat mount to rotate about a center axis relative to the bottom plate and base; and a connector connected to the base and to the plate assembly, the connector being configured to permit translational movement of the plate assembly as a single unit upon the top of the base between a driving position and a resting position with respect to the base;

wherein the base further comprises a plurality of encapsulators extending from the top of the base toward the bottom plate;

wherein the plate assembly further comprises a plurality of engagement members extending from the bottom plate toward the top of the base;

wherein at least one of the plurality of encapsulators comprises a channel having a web, the web defining a slot having an open end and a closed end, and first and second flanges extending from the web and connected to the top of the base, wherein at least one of the engagement members comprises a shank having a first end and a second end, the first end connected to the bottom plate and a head connected to the second end, wherein the shank is selectively receivable within the slot, and the head is selectively receivable between the web and the top of the base, and wherein one of the plurality of encapsulators engages one of the plurality of engagement members when the plate assembly is in the driving position and wherein the one of the plurality of encapsulators or another one of the plurality of encapsulators engages another one of the plurality of engagement members when the plate assembly is in the resting position.

18. The seat pedestal of claim 17 wherein the one of the plurality of encapsulators engages one of the plurality of engagement members when the plate assembly is in the driving position and wherein the one of the plurality of encapsulators engages another one of the plurality of engagement members when the plate assembly is in the resting position.

19. The seat pedestal of claim 17 wherein the one of the plurality of encapsulators engages one of the plurality of engagement members when the plate assembly is in the driving position and wherein another one of the plurality of encapsulators engages another one of the plurality of engagement members when the plate assembly is in the resting position.

20. The seat pedestal of claim 17, wherein each of the plurality of encapsulators and each of the plurality of engagement members is configured so that lateral displacement of the plurality of engagement members within the slots of the corresponding encapsulators causes each of the plurality of engagement members to be displaced axially toward the top of the base.

21. A seat pedestal for supporting a seat, the seat pedestal comprising:
   a base, the base comprising a top;
   a plate assembly connected to the top of the base, the plate assembly comprising a bottom plate, a seat mount for supporting a seat, a bearing between the bottom plate and the seat mount to permit the seat mount to rotate about a center axis relative to the bottom plate and base; and
   a connector connected to the base and to the plate assembly, the connector being configured to permit translational movement of the plate assembly as a single unit upon the top of the base between a driving position and a resting position with respect to the base;
   wherein one of the base and the plate assembly further comprises an encapsulator extending from the one of the base and the plate assembly toward the other of the base and the plate assembly;
   wherein the other of the base and the plate assembly further comprises a plurality of engagement members extending from the other of the base and the plate assembly toward the one of the base and the plate assembly; and
   wherein the encapsulator engages the engagement member when the plate assembly is in the driving position.

\* \* \* \* \*